US010139179B2

United States Patent
Downing

(10) Patent No.: US 10,139,179 B2
(45) Date of Patent: Nov. 27, 2018

(54) BIOMETRIC IDENTIFICATION SYSTEM FOR GUN

(71) Applicant: Gentex Corporation, Zeeland, MI (US)

(72) Inventor: Steven R. Downing, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/840,280

(22) Filed: Dec. 13, 2017

(65) Prior Publication Data

US 2018/0164061 A1 Jun. 14, 2018

Related U.S. Application Data

(60) Provisional application No. 62/433,506, filed on Dec. 13, 2016.

(51) Int. Cl.
| | |
|---|---|
| *F41A 17/06* | (2006.01) |
| *G06F 21/32* | (2013.01) |
| *G06K 9/00* | (2006.01) |
| *F41G 1/17* | (2006.01) |
| *H04N 5/33* | (2006.01) |
| *F41A 17/20* | (2006.01) |
| *G06K 9/20* | (2006.01) |

(52) U.S. Cl.
CPC ............ *F41A 17/066* (2013.01); *F41A 17/06* (2013.01); *F41A 17/20* (2013.01); *F41G 1/17* (2013.01); *G06F 21/32* (2013.01); *G06K 9/00* (2013.01); *G06K 9/00288* (2013.01); *G06K 9/00597* (2013.01); *G06K 9/20* (2013.01); *H04N 5/33* (2013.01)

(58) Field of Classification Search
CPC ...... F41A 17/20; F41A 17/066; F41A 17/063; F41A 17/30; F41A 17/06; F41A 17/00; G06K 9/00295; G06K 9/00597; G06F 21/32
See application file for complete search history.

(56) References Cited

U.S. PATENT DOCUMENTS

| | | | | |
|---|---|---|---|---|
| 5,570,528 | A | * | 11/1996 | Teetzel ................. F41A 17/066 42/70.05 |
| 5,735,070 | A | * | 4/1998 | Vasquez .................... F41A 9/62 42/1.02 |
| 6,343,140 | B1 | | 1/2002 | Brooks |
| 6,345,461 | B1 | * | 2/2002 | Constant ................ F41A 17/04 42/70.11 |

(Continued)

FOREIGN PATENT DOCUMENTS

| | | |
|---|---|---|
| JP | 2003121097 A | 4/2003 |
| RU | 2461876 C1 | 9/2012 |

*Primary Examiner* — Derrick R Morgan
(74) *Attorney, Agent, or Firm* — Price Heneveld LLP; Bradley D. Johnson

(57) ABSTRACT

A user identification assembly for a firearm includes a sight configured for use on said firearm. The sight being positioned on said firearm to provide a point of aim to a user. A light source is disposed on the sight and projects toward the user in a direction opposite the point of aim. An image sensor is disposed on the sight and is configured to capture image data of an object. The image sensor is configured to identify the user of said firearm. A controller is in communication with the image sensor and is configured to allow operation of said firearm based on the captured image data.

20 Claims, 3 Drawing Sheets

(56) References Cited

U.S. PATENT DOCUMENTS

| | | | |
|---|---|---|---|
| 6,360,468 B1 * | 3/2002 | Constant | F41A 9/53 42/65 |
| 6,678,984 B1 * | 1/2004 | Rapp | F41A 17/066 42/70.01 |
| 6,817,130 B2 * | 11/2004 | Ivanov | F41A 17/20 382/121 |
| 7,155,855 B2 | 1/2007 | Mauch et al. | |
| 8,049,597 B1 * | 11/2011 | Murakami | G06F 21/32 340/5.1 |
| 8,369,595 B1 * | 2/2013 | Derakhshani | G06K 9/0061 382/117 |
| 9,310,147 B2 | 4/2016 | Milde, Jr. | |
| 9,857,133 B1 * | 1/2018 | Kloepfer | F41A 17/066 |
| 9,885,530 B2 * | 2/2018 | Houde-Walter | F41A 17/063 |
| 2002/0157296 A1 * | 10/2002 | Vivian | F41A 17/066 42/70.11 |
| 2006/0117632 A1 * | 6/2006 | Meyerle | F41A 17/063 42/70.01 |
| 2006/0200683 A1 * | 9/2006 | King | G06F 21/32 713/193 |
| 2006/0262480 A1 * | 11/2006 | Stewart | F41A 17/066 361/251 |
| 2008/0044063 A1 * | 2/2008 | Friedman | A61B 3/1216 382/117 |
| 2008/0163536 A1 * | 7/2008 | Koch | F41A 17/066 42/111 |
| 2009/0080712 A1 * | 3/2009 | D'Souza | G06K 9/00597 382/117 |
| 2010/0022089 A1 | 1/2010 | Takei et al. | |
| 2011/0056108 A1 * | 3/2011 | McCord | F41A 17/066 42/70.01 |
| 2011/0102137 A1 * | 5/2011 | Schroter | G06K 9/0004 340/5.52 |
| 2012/0019379 A1 * | 1/2012 | Ben Ayed | G08B 13/1436 340/539.1 |
| 2013/0016215 A1 * | 1/2013 | Bitar | F41G 1/38 348/143 |
| 2013/0223681 A1 * | 8/2013 | Lee | G06K 9/00597 382/103 |
| 2013/0283660 A1 * | 10/2013 | Matthews | F41G 1/30 42/113 |
| 2014/0055567 A1 | 2/2014 | Dyer | |
| 2014/0319215 A1 * | 10/2014 | Farca | F41G 1/38 235/404 |
| 2014/0363058 A1 * | 12/2014 | Emmett | G06K 9/0061 382/117 |
| 2015/0134087 A1 * | 5/2015 | Palmer | F41A 17/063 700/90 |
| 2016/0012218 A1 * | 1/2016 | Perna | G06K 9/0061 726/18 |
| 2016/0091281 A1 * | 3/2016 | Gwillim, Jr. | F41G 1/345 42/111 |
| 2017/0251366 A1 * | 8/2017 | Perna | A61B 3/1216 |
| 2017/0284754 A1 * | 10/2017 | Chakraborty | F41A 17/063 |
| 2017/0286654 A1 * | 10/2017 | Nicoll | F41A 17/063 |
| 2017/0328661 A1 * | 11/2017 | Milde, Jr. | F41A 17/063 |

* cited by examiner

BIOMETRIC IDENTIFICATION SYSTEM FOR GUN

CROSS-REFERENCE TO RELATED APPLICATION

This application claims priority to and the benefit under 35 U.S.C. § 119(e) of U.S. Provisional Application No. 62/433,506, filed on Dec. 13, 2016, entitled "BIOMETRIC IDENTIFICATION SYSTEM FOR GUN," the disclosure of which is hereby incorporated herein by reference in its entirety.

FIELD OF THE DISCLOSURE

The present disclosure generally relates to an identification system, and more particularly to a biometric identification system for a gun.

SUMMARY OF THE DISCLOSURE

According to one aspect of the present disclosure, a user identification assembly for a firearm includes a sight configured for use on said firearm. The sight being positioned on said firearm to provide a point of aim to a user. A light source is disposed on the sight and projects toward a user in a direction opposite the point of aim. An image sensor is disposed on the sight and is configured to capture image data of an object. The image sensor is configured to identify a user of said firearm. A controller is in communication with the image sensor and is configured to allow operation of said firearm based on the captured image data.

According to another aspect of the present disclosure, a user identification assembly includes a non-optic sight configured for use on a firearm. The non-optic sight is positioned on the firearm to provide a point of aim to a user. A light source is disposed on the non-optic sight and projects toward a user in a direction opposite the point of aim. An image sensor is disposed on the non-optic sight and is configured to capture image data of an object. The image sensor is configured to identify a particular user.

According to yet another aspect of the present disclosure, a user identification assembly includes a non-optic sight configured for use on a firearm. The non-optic sight is positioned on the firearm to provide a point of aim to a user. A light source is disposed on the non-optic sight and projects toward a user in a direction opposite the point of aim. An image sensor is disposed on the non-optic sight and is configured to capture image data of an object. The image sensor is operably coupled with a controller to identify a particular user.

These and other features, advantages, and objects of the present disclosure will be further understood and appreciated by those skilled in the art by reference to the following specification, claims, and appended drawings.

DETAILED DESCRIPTION

Figure 1:
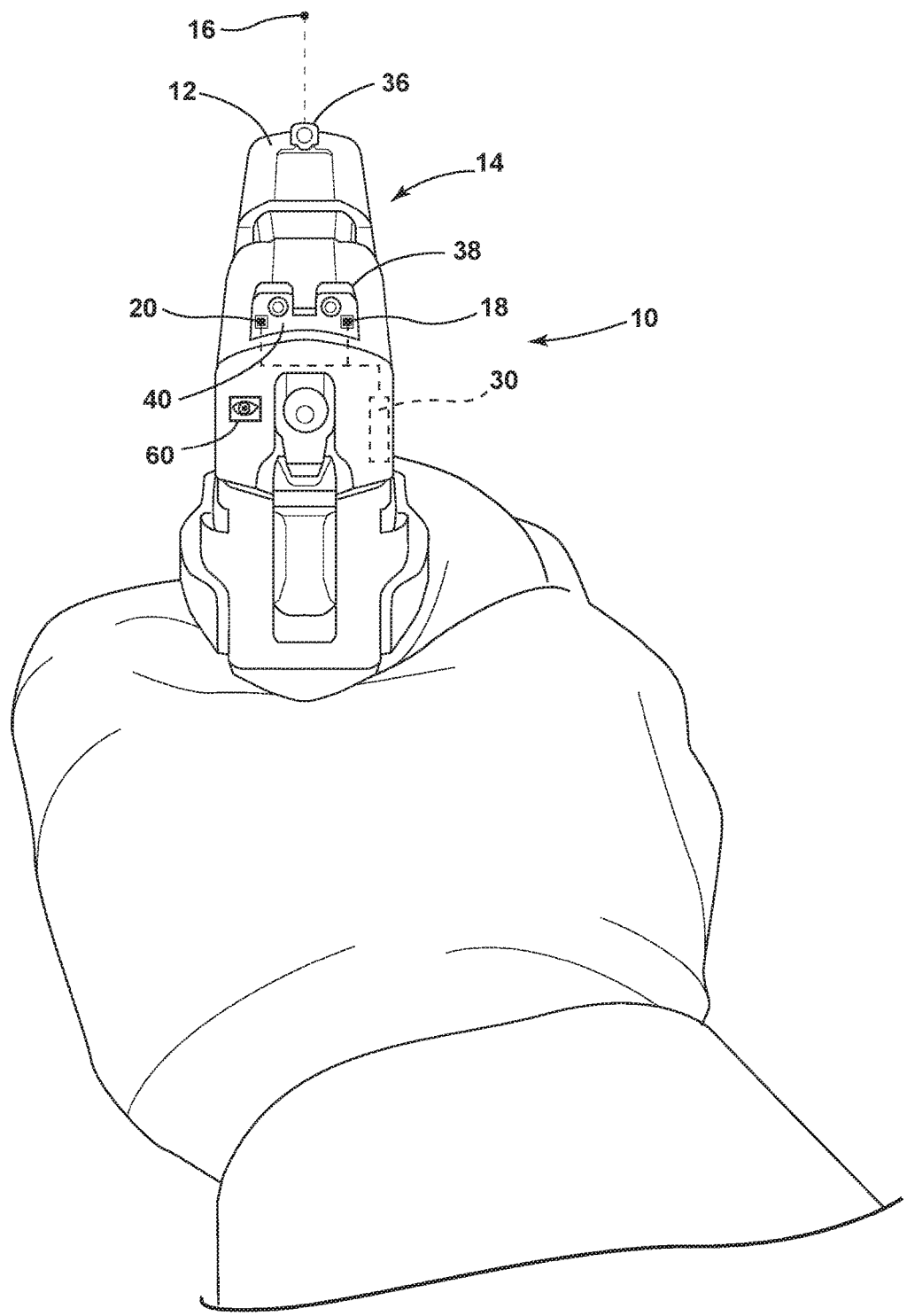
FIG. 1 is a top perspective view of one embodiment of a user identification system of the present disclosure disposed on a firearm.

The present illustrated embodiments reside primarily in combinations of method steps and apparatus components related to a biometric identification system for a gun. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to the intended viewer, and the term "rear" shall refer to the surface of the device further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
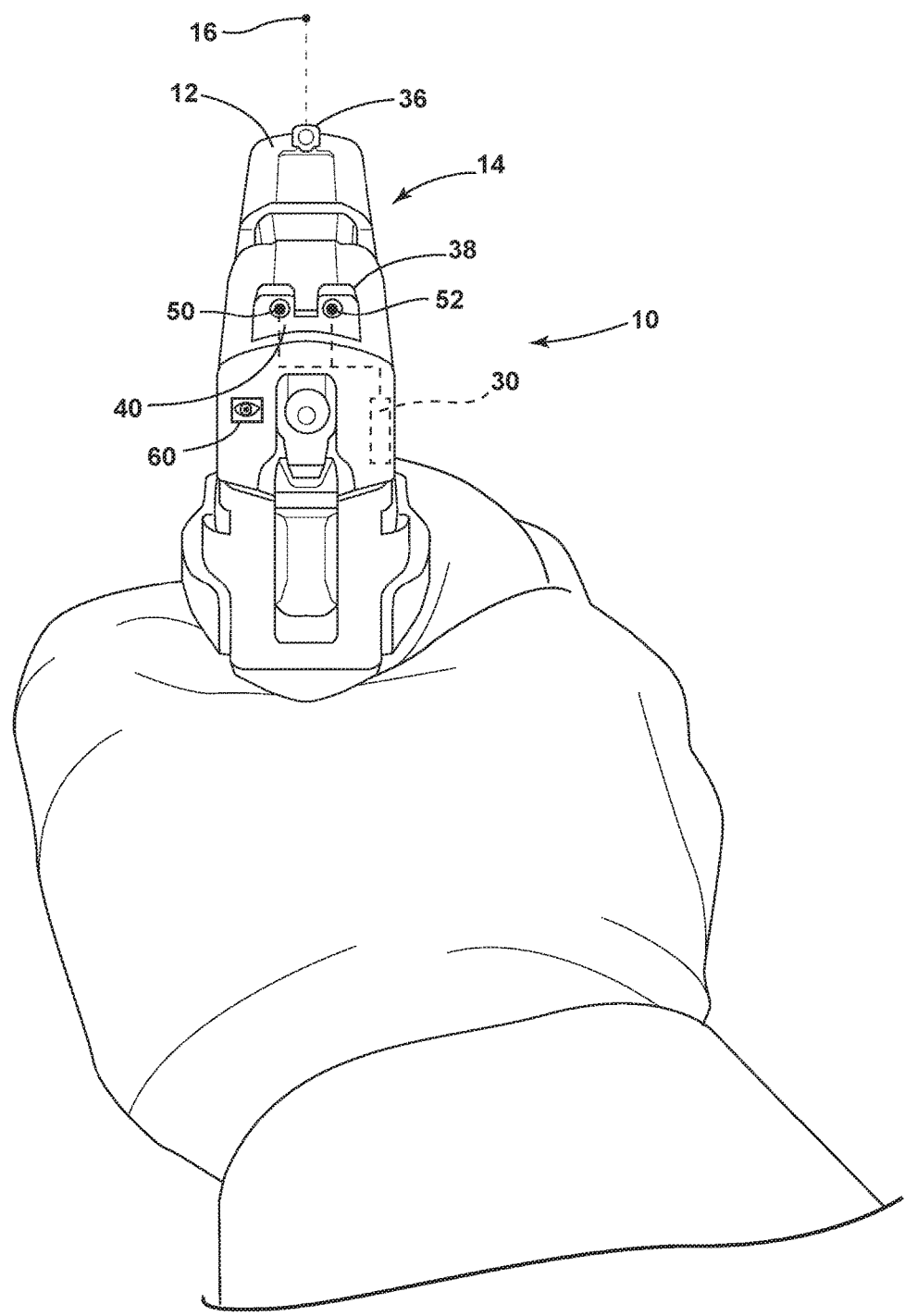
FIG. 2 is a top perspective view of another embodiment of a user identification system of the present disclosure disposed on a firearm.
Figure 3:
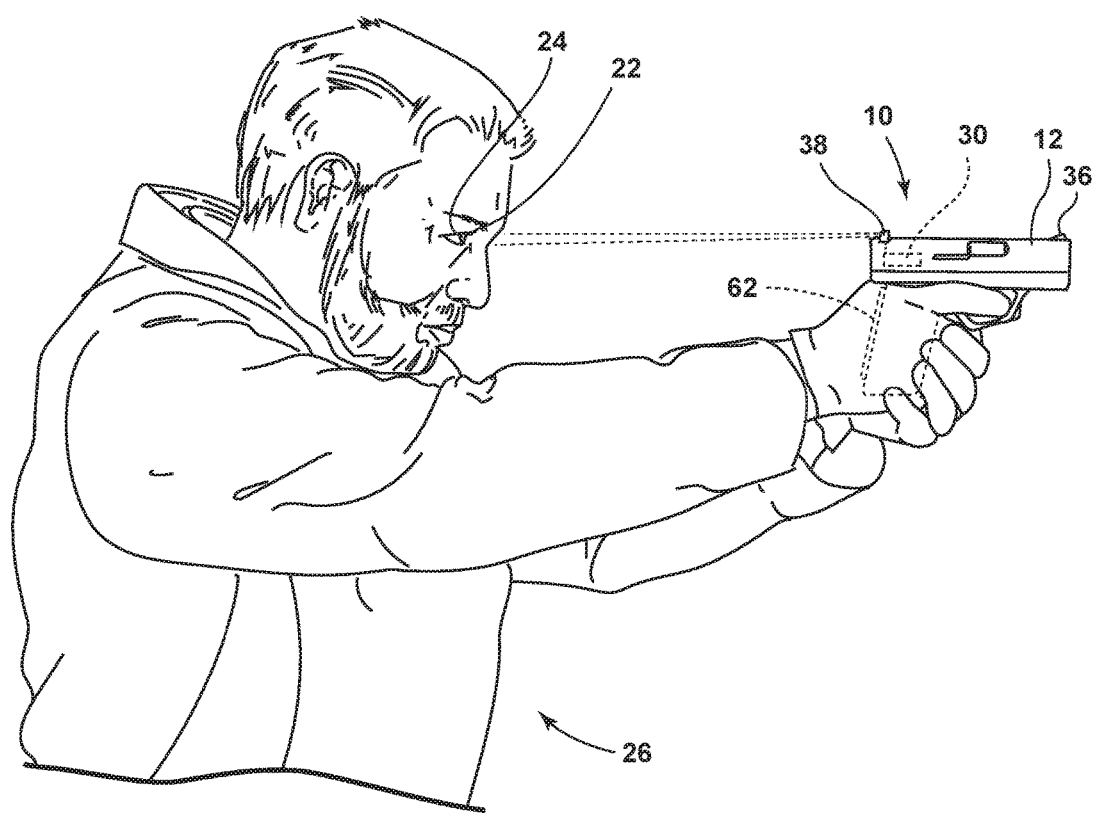
FIG. 3 is a side elevational view of the user identification system of FIGS. 1 and 2.

Referring to FIGS. 1-3, reference numeral 10 generally designates a user identification assembly for a firearm 12 that includes a sight 14 configured for use on the firearm 12. The sight 14 is positioned on the firearm 12 to provide a point of aim 16 to a user 26. A light source 18 is disposed on the sight 14 and projects toward a user in a direction opposite the point of aim 16. An image sensor 20 is disposed on the sight 14 and is configured to capture image data 22 of an object 24. The image sensor 20 is configured to identify the user 26 of the firearm 12. A controller 30 is in communication with the image sensor 20 and is configured to allow operation of the firearm 12 based on the captured image data 22. The captured image data 22 may include unique biometric features of the user 26.

Referring to FIGS. 1 and 2, the user identification assembly 10 acts in the form of a scanning apparatus operable to perform an identification function. In an exemplary embodiment, the scanning apparatus is incorporated in a firearm, such as a pistol, rifle, or shotgun, for example. The user identification assembly 10 may incorporate a user identification function configured to identify an operator of a firearm based on distinct characteristics unique to an individual. The user identification assembly 10 may identify characteristics unique to an individual. These may include facial recognition, eye (iris and/or pupil) recognition, etc. The sight 14 may include optical or computing and/or pupil sights, or may include a non-optic sight, such as fixed sights, commonly referred to as iron sights. For iron sight constructions, the sight 14 may include a front sight 36 and a rear sight 38.

The user identification function may utilize an infrared illumination of an iris of an eye in order to illuminate the eye for identification. In some embodiments, the illumination occurs in the near infrared (NIR) range, for example, wavelengths ranging from 810 nm to 850 nm. Alternatively, the wavelengths of the infrared waves may exceed 900 nm. In this instance, because this wavelength is outside the visible spectrum of the user 26, the eye can be illuminated to provide a clear view of the retina without distracting or blinding the user 26. This configuration is particularly useful in collecting image data at dusk, dawn, nighttime, or any instance inside or outside where visibility is low. In these instances, light in the visible spectrum may blind or distract the user 26. In some implementations, however, the sight 14 may include one or more light sources that emit light in the visible spectrum which are configured to illuminate at least one iris of the user 26. These may be instances where the ambient light level is high. The one or more light sources may also have minimal light output and may be used to focus the view of the user 26 so that the image sensor 20 can have a proper field of view of the eye of the user 26 to capture the image data 22 related to the iris or retina of the user 26.

To provide for the user identification function, for example, an eye or face scan, the image sensor 20 may be disposed proximate the rear sight 38 on a rear wall 40 thereof. The rear sight 38 is used in conjunction with the front sight 36 to aim the firearm 12 at an intended target. The image sensor 20 may correspond to, for example, a digital charge-coupled device (CCD) or complementary metal-oxide-semiconductor (CMOS) active pixel sensor, although these are examples only and should not be construed as limiting. The image sensor 20 may be in communication with the light source 18, which may correspond to one or more infrared emitters configured to output an emission of light in the NIR or infrared (IR) range. In this configuration, the image sensor 20 may be configured to selectively activate the one or more infrared emitters corresponding to the light source 18 to illuminate the iris such that an identity of an operator of the vehicle may be determined.

It is generally contemplated that the light sources 18 could include infrared emitter banks that emit infrared radiation, near infrared radiation or radiation in the visible spectrum, or any combination of these. Each infrared emitter bank may include one or more light emitting diodes, which may be grouped in a matrix or otherwise grouped and disposed proximate the rear wall 40 of the sight 14 or on another rearward portion of the firearm 12 in unobstructed view of the eyes of the user 26. Further, it will be understood that any emitters or emitter banks may be positioned anywhere on the firearm 12 that would enable light (visible or not) to be projected onto the eye of an operator. For example, the emitters or emitter banks could project from iron sights, the handle, the stock, a scope, etc.

In another embodiment as shown in FIG. 2, the plurality of light sources may correspond to a single light emitting diode or an emitter bank 50 and an image sensor 52 that are defined as part of the sight 14 of the firearm 12. The sight 14, as illustrated in FIG. 2, includes an iron sight without any additional optics. The emitter bank 50 may be configured to output a light emission in the NIR range from a first side of the sight 14 and the image sensor 52 may be configured to capture image data that is processed by the controller 30 for the purpose of user identification and authentication.

In another exemplary embodiment, multiple emitter banks may correspond to more or fewer LEDs or banks of LEDs. In some embodiments, the scanning apparatus may utilize more intense or less intense LEDs. In some embodiments, the scanning apparatus may utilize a greater number of or more intense LEDs. The user identification assembly 10 may be configured to vary or change the light output by the light sources 18. The user identification assembly 10 can also be deactivated by an approved user.

The image sensor 20 may be disposed on a circuit, for example, a printed circuit board, in communication with the controller 30. The controller 30 may further be in communication with various other devices including a safety, trigger, or other biometric sensor of the firearm 12. The controller 30 may correspond to one of more processors or circuits, which may be configured to process the image data 22 received from the image sensor 20. In this configuration, the image data 22 may be communicated from the image sensor 20 to the controller 30. The controller 30 may process the image data 22 with one or more algorithms configured to determine an identity of the user of the firearm 12.

The firearm 12 may include a display 60 configured to provide an indication that authorization to use the firearm 12 has been granted. The display 60 may simply be a light indicating that the user 26 has been authenticated and can use the firearm 12. Alternatively, the display 60 may be configured to help the user 26 position the eye of the user 26 so that data can be captured by the imager sensors 20, 52. In one embodiment, the user 26 aligns the eye of the user 26 until a visual of the eye is displayed in the display 60. The image sensors 20, 52 then capture the pertinent image data and the features of the firearm 12 are made available to the user 26 by the controller 30. Other safety features, such as a grip safety 62 on a handle of the firearm 12, may work in concert with the user identification assembly 10 to authenticate the user 26 or maintain access during use. For example, the user 26 may be authored by the user identification assembly 10 and authorization may be maintained by the controller 30 only as long as the grip safety 62 is depressed. If the grip safety 62 is released, the controller 30 deactivates authorization to the firearm 12 until the user identification assembly 10 re-authenticates the user 26.

The controller 30 is operably coupled with both the image sensor 20 and the safety features of the firearm 12. Accordingly, the controller 30 is configured to prevent firing of the firearm 12 by an unauthorized user. Authorization may be provided to a user 26 that has provided the requisite biometric identification. It is contemplated that such authorization can be set up initially via a special key (mechanical or digital) that grants full permissions to the user 26. The user 26 can then grant access to other users or restrict usage. The same key may be used to reset or restart authentication, if desired.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A user identification assembly for a firearm, the user identification assembly comprising:
   a sight configured for use on said firearm, the sight being positioned on said firearm to provide a point of aim to a user;
   a light source disposed on the sight and projecting toward a face of the user in a direction opposite the point of aim, the light source defining a first sighting feature configured to be aligned with a sight feature of a front sight to aim the firearm;
   an image sensor disposed on the sight and configured to capture image data associated with biometric features on the face of the user, the image sensor being configured to identify the user of said firearm based on recognition of the biometric features, the image sensor defining a second sighting feature configured to be aligned with a sight feature of a front sight to aim the firearm; and
   a controller in communication with the image sensor and configured to allow operation of said firearm based on the captured image data.

2. The user identification assembly of claim 1, wherein the controller is configured to prevent firing of said firearm by an unauthorized user.

3. The user identification assembly of claim 1, further comprising:
   a display configured to present the captured image data proximate the sight.

4. The user identification assembly of claim 3, wherein the display provides an indication that authorization to use said firearm has been granted.

5. The user identification assembly of claim 1, wherein the captured image data includes unique biometric features of the user.

6. The user identification assembly of claim 5, wherein the unique biometric features of the user correspond to an eye of the user.

7. The user identification assembly of claim 1, wherein the light source is configured to emit light in a near infrared (NIR) range.

8. The user identification assembly of claim 1, wherein the controller is operably coupled with a grip safety on a handle of said firearm.

9. A user identification assembly comprising:
   iron sights configured for use on a firearm, the iron sights being positioned on the firearm to provide a point of aim to a user;
   a light source disposed on the iron sights and projecting toward the user in a direction opposite the point of aim, the light source defining a sighting feature configured to be aligned with a sight feature of a front sight to aim the iron sights of the firearm; and
   an image sensor disposed on the iron sights and configured to capture image data of an object to identify a particular user, the image sensor defining a sighting feature configured to be aligned with a sight feature of a front sight to aim the iron sights of the firearm.

10. The user identification assembly of claim 9, further comprising:
    a controller configured to prevent firing of said firearm by an unauthorized user.

11. The user identification assembly of claim 9, further comprising:
    a display configured to present the captured image data proximate the iron sights.

12. The user identification assembly of claim 9, wherein the captured image data includes unique biometric features of the user.

13. The user identification assembly of claim 12, wherein the unique biometric features of the user correspond to an eye of the user.

14. The user identification assembly of claim 9, wherein the light source is configured to emit light in a near infrared (NIR) range.

15. A user identification assembly comprising:
    iron sights configured for use on a firearm, the iron sights being positioned on the firearm to provide a point of aim to a user;
    a light source disposed on the iron sights and projecting toward the user in a direction opposite the point of aim, the light source defining a first sighting feature configured to be aligned with a sight feature of a front sight to aim the firearm;

an image sensor disposed on the iron sights and configured to capture image data of an object, the image sensor being operably coupled with a controller to identify a particular user associated with biometric features of the user, the image sensor defining a second sighting feature configured to be aligned with a sight feature of a front sight to aim the firearm; and a display adjacent the iron sights, the display configured to display an image of the captured image data to the user.

16. The user identification assembly of claim 15, further comprising:

a controller configured to prevent firing of said firearm by an unauthorized user.

17. The user identification assembly of claim 15, further comprising:

a display configured to present the captured image data proximate the iron sights.

18. The user identification assembly of claim 15, wherein the captured image data includes unique biometric features of the user.

19. The user identification assembly of claim 18, wherein the unique biometric features of the user correspond to an eye of the user.

20. The user identification assembly of claim 15, wherein the light source is configured to emit light in a near infrared (NIR) range.

* * * * *